US009525801B2

United States Patent
Yamamoto

(10) Patent No.: US 9,525,801 B2
(45) Date of Patent: Dec. 20, 2016

(54) IMAGE READING CONTROL APPARATUS AND METHOD FOR EXECUTING IMAGE READING PROCESSING BASED ON A READING INSTRUCTION AND INHIBITING A READING APPARATUS FROM ACCEPTING NEW TASKS

(75) Inventor: Hiroyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/528,643

(22) Filed: Jun. 20, 2012

(65) Prior Publication Data

US 2013/0003133 A1 Jan. 3, 2013

(30) Foreign Application Priority Data

Jun. 30, 2011 (JP) ................................. 2011-146195

(51) Int. Cl.
  *H04N 1/48* (2006.01)
  *H04N 1/00* (2006.01)
(52) U.S. Cl.
  CPC .............. *H04N 1/48* (2013.01); *H04N 1/0096* (2013.01); *H04N 1/00933* (2013.01)
(58) Field of Classification Search
  CPC .... H04N 1/48; H04N 1/00222; H04N 1/0022; H04N 1/0023; H04N 1/00233; H04N 1/00241
  See application file for complete search history.

(56) References Cited

U.S. PATENT DOCUMENTS

| 6,651,081 | B1 * | 11/2003 | Salgado | G06F 9/5044 358/1.14 |
| 2009/0225364 | A1 * | 9/2009 | Sato | H04N 1/00912 358/1.15 |
| 2010/0231964 | A1 * | 9/2010 | Watanabe | H04N 1/00222 358/1.15 |

FOREIGN PATENT DOCUMENTS

| JP | 2002-356043 A | 12/2002 |
| JP | 2006-345329 A | 12/2006 |
| JP | 2009-213060 A | 9/2009 |
| JP | 2010-239263 A | 10/2010 |

* cited by examiner

*Primary Examiner* — Christopher D Wait
(74) *Attorney, Agent, or Firm* — Canon U.S.A., Inc. IP Division

(57) ABSTRACT

An image reading control apparatus performs processing to achieve adequate execution of image reading processing based on a reading instruction which is provided while the image reading processing is being performed. In a case where the image reading control apparatus detects that the image reading apparatus provides an image reading instruction, it is determined whether processing based on the image reading processing is being performed. In a case where the image reading apparatus is currently in the processing based on the image reading processing, the image reading control apparatus causes the currently detected processing for the image reading instruction to stand by as well as requests the image reading apparatus not to accept the other new job.

14 Claims, 6 Drawing Sheets

IMAGE READING CONTROL APPARATUS AND METHOD FOR EXECUTING IMAGE READING PROCESSING BASED ON A READING INSTRUCTION AND INHIBITING A READING APPARATUS FROM ACCEPTING NEW TASKS

BACKGROUND OF THE INVENTION

Field of the Invention

The present invention relates to an image reading control apparatus for controlling image reading processing performed by an image reading apparatus and an image reading method thereof.

Description of the Related Art

Conventionally, an image reading apparatus is known in which predetermined processing set at a personal computer (PC) side is executed when an operation from an operation unit provided in the image reading apparatus, e.g., scanner, is detected by the PC connected to the image reading apparatus. Japanese Patent Laid-open Publication No. 2010-239263 discusses an image reading apparatus in which, as the predetermined processing, a scanner driver is started up to cause the image reading apparatus to read an image. With the above described configuration, a user can cause the image reading apparatus to execute image reading processing using the scanner driver of the PC with an operation performed at an image reading apparatus side (i.e., on-line processing).

Further, an image reading apparatus having, for example, a print function capable of printing image data acquired by reading an image is known. In this case, the image reading apparatus can read the image without involving communication with a PC (i.e., off-line processing).

In a case where the image reading apparatus performs the image reading processing by using the scanner driver of the PC in response to an operation from an operation unit of the image reading apparatus, the user provides a reading instruction from the operation unit of the image reading apparatus every time the user exchanges a document. There is an image reading apparatus in which, in a case where the image reading apparatus accepts the reading instruction from the operation unit, the image reading apparatus inhibits acceptance of a job execution instruction according to the other off-line processing for a predetermined period. Further, there is an image reading apparatus in which, when the image reading apparatus receives an instruction to start reading an image from the operation unit of the image reading apparatus, the image reading instruction according to the off-line processing is inhibited.

In a case where the image reading is performed by using the scanner driver in response to the operation from the operation unit of the image reading apparatus while the document is exchanged, if processing to be performed at the PC side in the former read-out processing has not ended yet, the PC does not start executing the following reading instruction. On the other hand, in a case where a start-reading instruction is not provided from the PC even though a predetermined time has passed after the following reading instruction is provided from the operation unit of the image reading apparatus, some image reading apparatus unban a state that the other reading instruction is inhibited since a possible abnormality occurs at the PC side. After the inhibiting state is unbanned, the image reading apparatus can accept the image reading instruction according to the off-line processing and can cause the scanner driver to read the image according to the off-line processing.

However, in a case where it is only taking time to perform the processing at the PC side in the former reading processing, i.e., in a case where no abnormality occurs at the PC side, the PC instructs the image reading apparatus to start reading an image based on the following reading instruction when the former reading processing is completed. Therefore, in a case where the user has set the document in the image reading apparatus to cause the image reading apparatus to read the image of the document according to the off-line processing, such a problem may occur that a start-reading instruction to the following reading instruction is provided to the image reading apparatus and therefore an unexpected image may be transmitted to the PC side. Alternatively, in the image reading apparatus, a start of the operation to read an image according to the off-line processing may inhibit an acceptance of the other reading instruction. As a result thereof, a start-reading instruction based on the following reading instruction from the PC may not be accepted.

SUMMARY OF THE INVENTION

The present invention provides an image reading control apparatus in which the above described problem is solved and an image reading method thereof. The present invention further provides an image reading control apparatus capable of suitably executing the image reading processing based on a reading instruction provided during execution of the former image reading processing and image reading method thereof.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
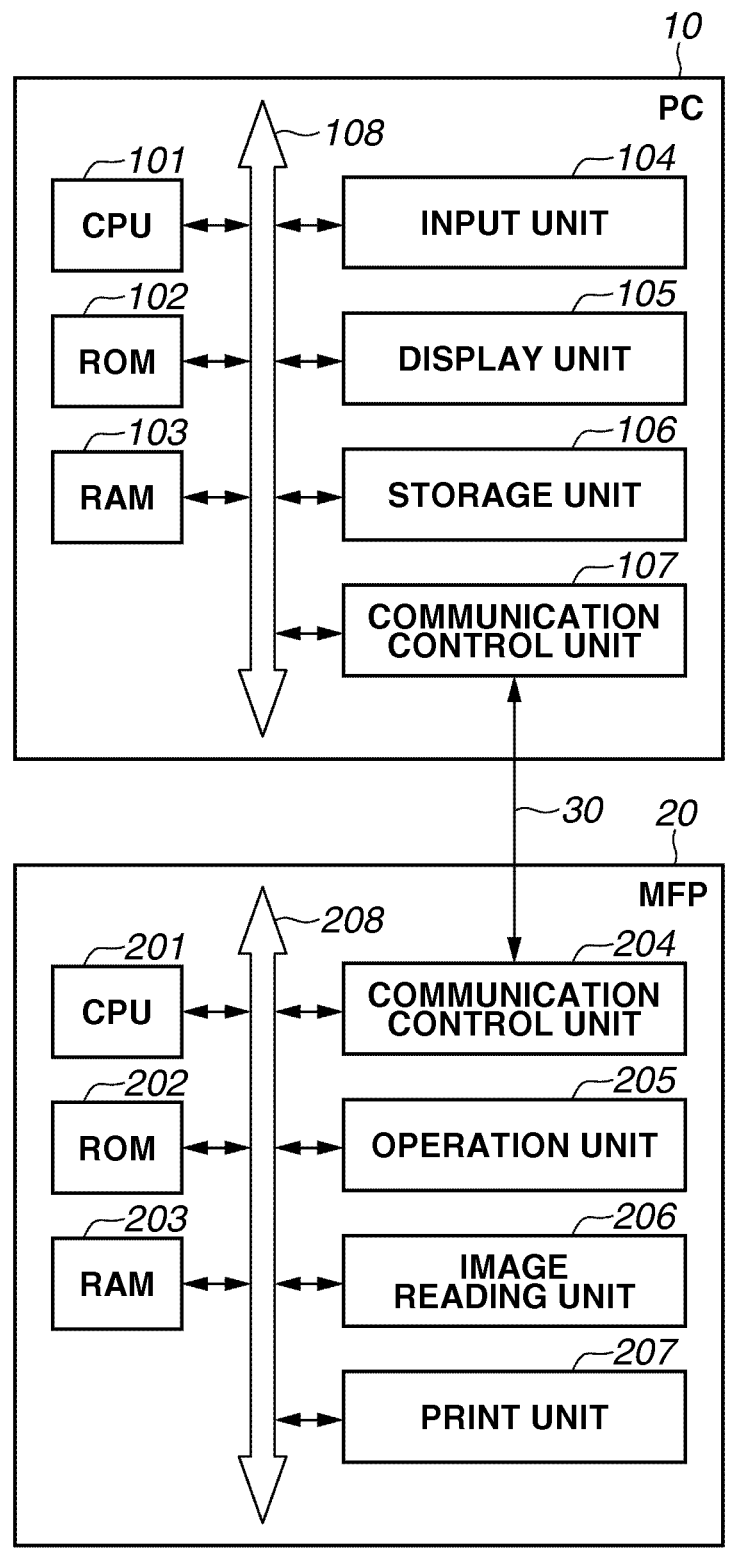
FIG. 1 illustrates an image reading system according to an exemplary embodiment.

FIG. 1 illustrates an image reading system in the present exemplary embodiment. A personal computer (PC) 10 functions as an image reading control apparatus capable of at least controlling image reading processing performed by an image reading apparatus. A central processing unit (CPU) 101 loads a program stored in a read-only memory (ROM) 102 or a storage unit 106 to a random access memory (RAM) 103 and runs the program on the RAM 103, thereby controlling an operation of the PC 10.

Installation of the program (i.e., software) for performing control of the image reading apparatus in a general purpose PC can realize the PC 10 that functions as the image reading control apparatus. An input unit 104 accepts an operation of the user to input contents of the operation into the CPU 101. A display unit 105 displays various types of information to be provided to the user.

The storage unit 106 stores a program to be executed by the CPU 101 and the various types of information having been input. A communication control unit 107 controls communication with an external device connected via a connection interface (I/F) 30. These units are communicable to each other via an internal bus 108.

In FIG. 1, a multi functional peripheral (MFP) 20 at least has a function as the image reading apparatus for reading an image. The MFP 20 has a plurality of functions relating to image reading processing. The MFP 20 here has a function of transmitting read-out image data to the PC 10 and a copy function of supplying thus read-out image data to a print unit 207 to cause the print unit 207 to print the read-out image data on a print medium such as a sheet.

A CPU 201 loads a program stored in the ROM 202 to the RAM 203 to run the program on the RAM 203, thereby controlling an operation of the MFP 20. A communication control unit 204 controls a communication with the external device connected via a connection interface (I/F) 30. An operation unit 205 accepts an operation from a user. Hard keys and soft keys, for example a touch panel, can be employed as the operation unit 205.

An image reading unit 206 optically reads out an image on a document and generates read-out image data based on the image. A print unit 207 applies a recording agent, e.g., a toner and an ink, onto a print medium based on the input image data to thereby print an image of the read-out image data. The function of transmitting the read-out image data to the PC 10 and the copy function are examples of functions held by the MFP 20. However, the MFP 20 may have a function of outputting the read-out image data to external devices including devices other than the PC 10 in addition to or instead of the copying function.

A wired I/F such as the Universal Serial Bus (USB), a wireless I/F such as the Bluetooth (registered trademark), and the like may be employed as the connection I/F 30. A relationship between the PC 10 and the MFP 20 may not be limited to a one-for-one connection but may be a connection via a wired local area network (LAN), a wireless LAN, an internet, and the like.

In the image reading system of the present exemplary embodiment, when the PC 10 monitors a specific operation in the operation unit 205 and detects the specific operation, a reading instruction provided by the scanner driver of the PC 10 can cause the image reading unit 206 to read the image. The PC 10 acquires the read-out image data generated according to the image reading processing. In a case where the user provides a copying instruction via the operation unit 205, the image reading processing is performed by the image reading unit 206 without the aid of the PC 10, then the image is printed and copied by the print unit 207.

Instead of the above, the copying as described below is also employable. The PC 10 causes the image reading unit 206 to execute image reading processing in response to a detection of the instruction from the operation unit 205, thereby acquiring the read-out image data, and subsequently the read-out image data is returned to the MFP 20 to cause the print unit 207 to print the read-out image data. Therefore, copying via the PC 10 is also possible.

Capturing of the read-out image data by the PC 10, copying via the PC 10, and causing to copy via the PC 10 are performed, respectively, according to contents of an operation in the operation unit 205. Whether to cause the PC 10 to monitor the operation of the operation unit 205 is to be preliminary registered in the RAM 203 according to the contents of the operation. Further, the PC 10 can cause the image reading unit 206 to execute the image reading processing according to a reading instruction provided from the scanner driver without resorting to the operation from the operation unit 205. Accordingly, the read-out image data can be acquired.

In a case where the image reading instruction is provided from the operation unit 205, the MFP 20 sets an operation inhibition period during which any other instruction for a new job (including a job other than a scanning job) is not accepted to prevent an erroneous operation and a reduction of a processing load. In a case where the MFP 20 cannot detect completion of the job even after the operation inhibition period has passed, the MFP 20 automatically unbans the operation inhibition period. As a result thereof, the instruction of the job provided by the operation unit 205 becomes acceptable.

Also, in a case where the MFP 20 receives a job interruption inhibition request (i.e., locking request) from the PC 10, the MFP 20 does not accept a new job execution instruction from the operation unit 205 (i.e., is placed in a job reception inhibiting mode). The job reception inhibiting mode is released in a case where an unlock request is received from the PC 10. Even if the unlock request is not received, in a case where the job is not completed even after a predetermined time has passed after receiving the locking request, the job reception inhibiting mode is unbanned. A time period before the job reception inhibiting mode is released is set to be longer than the time period required in automatically unbanning the above described operation inhibition period. The MFP 20 does not invalidate the accepted scanning instruction during the operation inhibition period and during the locked mode according to the locking request.

Figure 2:
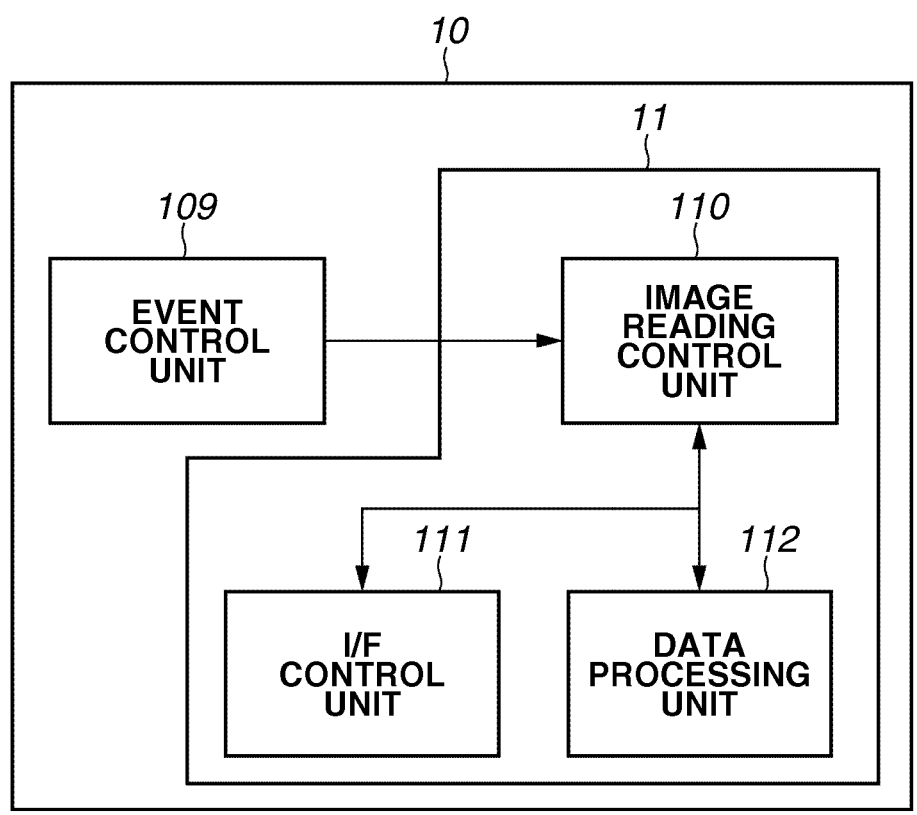
FIG. 2 is a block diagram illustrating a function held by a PC.

FIG. 2 is a block diagram illustrating a function included in the software to be installed in the PC 10. The PC 10 is installed with an Operating System (OS) and further installed with a scanner driver 11 running on the OS. An event control unit 109 is a module provided by the OS which monitors generation of an event in the MFP 20 and executes predetermined processing when the event control unit 109 detects the generation of the event. In other words, in a case where the event generated in the MFP 20 indicates an image reading instruction, the event control unit 109 instructs a start-up of the scanner driver 11 and causes the scanner driver 11 to execute the image reading processing.

At the time, a parameter (e.g., a size of a document to be read out, read-out resolution, designation of color or monochrome, and the like) for image reading is preliminarily designated in the scanner driver 11. The event control unit 109 may be, instead of the module provided by the OS, one of modules of the scanner driver 11 or the other application software.

The scanner driver 11 includes an image reading control unit 110, an interface (I/F) control unit 111, and a data processing unit 112. The above units can communicate with each other using various commands according to, for example, an inter-process communication. The units may be formed into independent modules, respectively, or may be formed into processing units contained in a single program.

The image reading control unit 110 is started up according to a start-up instruction from the event control unit 109. The image reading control unit 110 controls communication with the MFP 20 via the I/F control unit 111 and provides an instruction to process the read-out image data to the data processing unit 112. The image reading control unit 110 is started up every time the reading instruction is provided in the MFP 20. An operation of the image reading control unit 110 is ended (i.e., closed) when the image reading processing is completed.

The data processing unit 112 performs data processing sequentially by a page unit. The image reading control unit 110 can also be started up according to the operation of the input unit 104 of the PC 10 by the user. A user interface (UI) provided by the image reading control unit 110 is displayed on the display unit 105. According to the display, the user can instruct to start reading an image and designate contents of processing of the read-out image data.

In addition to the start-reading instruction, designation of a read-out parameter, designation of prescanning, designation of reading range after the prescanning can be performed via the UI. The I/F control unit 111 carries out processing via the communication control unit 107. The I/F control unit 111 transmits various control commands such as a reading instruction command to the MFP 20 based on an instruction from the image reading control unit 110 and receives a response to the command from the MFP 20 to transmit thus received response to the image reading control unit 110.

The I/F control unit 111 receives the read-out image data acquired by the MFP 20 reading out an image according to a reading instruction command, to transmit thus received read-out image data to the data processing unit 112. The data processing unit 112 performs processing on the read-out image data acquired via the I/F control unit 111 according to an instruction from the image reading control unit 110. Examples of the processing include image correction processing, color conversion processing, character recognition processing, and file storage.

Figure 3:
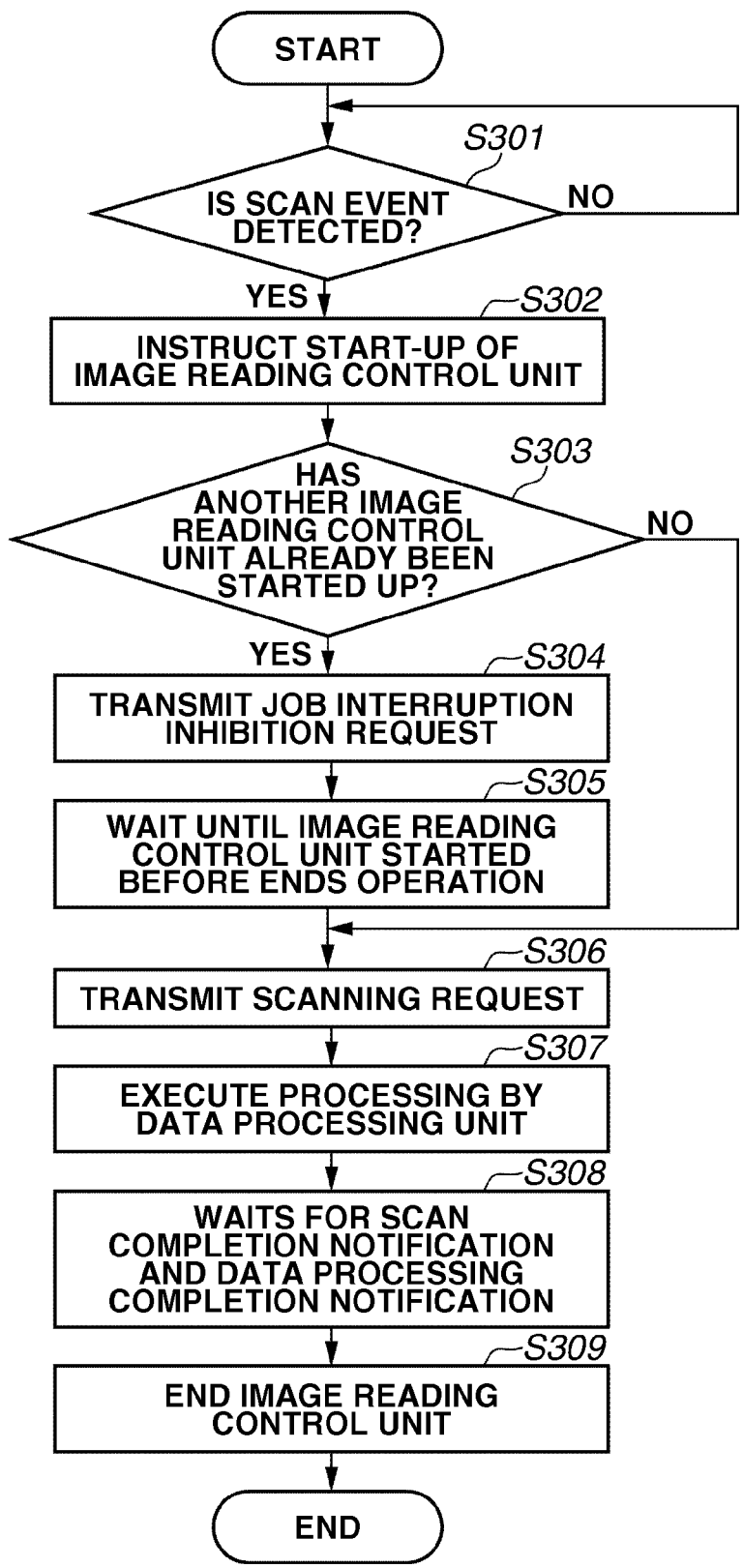
FIG. 3 is a flow chart illustrating a processing flow performed by the PC.

A flow of processing performed in the PC 10 is described below in a case where the reading instruction to be detected by the PC 10 is provided through the operation unit 205 of the MFP 20. FIG. 3 is a flow chart illustrating this processing flow. The processing is performed such that a program stored in the ROM 102 or the storage unit 106 is loaded to the RAM 103 to be executed by the CPU 101. The processing is mainly executed in association with the program illustrated in FIG. 2.

In FIG. 3, in step S301, the event control unit 109 monitors generation of a scan event in the MFP 20. The scan event is an event for executing the image reading processing via the PC 10. The scan event here is an event in which, when a scan button included in the operation unit 205 is pressed, the scanner driver 11 is started up to execute the image reading processing. The scan event is not limited to the operation of the operation unit 205 but may be various operations according to a specification of the MFP 20 or contents registered in the PC 10. For example, the scan event may be configured such that the MFP 20 detects that a document is set to the MFP 20 and the detection result is notified to the PC 10. In step S301, in a case where the event control unit 109 detects the generation of the scan event (YES in step S301), the processing proceeds to step S302.

In step S302, the event control unit 109 instructs to start up the image reading control unit 110. In step S303, the CPU 101 determines whether the image reading control unit 110 has already been started up in order to perform the other image reading processing. In this case, when the image reading control unit 110 has been already started up, there may be a plurality of documents to be read out by the MFP 20 and the image reading processing of the document having already been read out is not completed yet.

In a case where the image reading control unit 110 is started up, predetermined information is to be stored in a predetermined storage region of the RAM 103. Accordingly, in step S303, a determination can be made based on whether the information is stored. In a case where a positive determination is made in step S303 (YES in step S303), the processing proceeds to step S304. In a case where a negative determination is made in step S303 (NO in step S303), the processing proceeds to step S306.

In step S304, a job interruption inhibition request is transmitted to the MFP 20 via the I/F control unit 111 such that another job is not started by the MFP 20 before the image reading processing based on the reading event detected in step S301 is started. The job for inhibiting interruption in the MFP 20 may be only limited to a job using the image reading unit 206 or may be all the jobs including a job without resorting to the use of the image reading unit 206. Which job interruption is inhibited is determined at a side of the MFP 20.

In a case where the job interruption is inhibited in the MFP 20, the job execution instruction from the operation unit 205 is not accepted. In step S305, the PC 10 waits until the image reading control unit 110 determined as being started up in step S303 completes the image reading processing and the operation of the image reading control unit 110 is ended.

In step S306, the image reading control unit 110 that is started up in response to the start-up instruction in step S302 transmits a scanning request to the MFP 20 via the I/F control unit 111. The MFP 20 having received the scanning request reads out an image on a document by using the image reading unit 206 and transmits thus acquired read-out image data to the PC 10. In step S307, the PC 10 receives the read-out image data transmitted from the MFP 20 and predetermined data processing is performed on the thus received read-out image data by the data processing unit 112. In a case where a negative determination is made in step S303 (NO in step S303), in step S306, the locking request is transmitted to the MFP 20 and the scanning request is thereafter transmitted to the MFP 20.

In step S308, the image reading control unit 110 waits for a scan completion notification from the MFP 20 and the data processing completion notification from the data processing unit 112. When the image reading control unit 110 receives the scan completion notification and the data processing completion notification, in step S309, an operation of the image reading control unit 110 having been started up according to the start-up instruction in step S302 is ended. In step S309, when the operation of the image reading control unit 110 is ended, the unlock request is transmitted to the MFP 20. As a result thereof, the job interruption inhibition mode is unbanned in the MFP 20.

In a case where a negative determination is made in step S303 (NO in step S303) and the scanning request in step S306 is transmitted, in step S308, the processing may proceed to step S309, when the scan completion notification is received in step S308, without waiting for the completion of the data processing performed by the data processing unit 112.

An example of a processing flow is described below in detail when the image reading processing to be performed via the PC 10 is executed by the above described processing according to the generation of the scan event in the MFP 20.

Figure 4A:
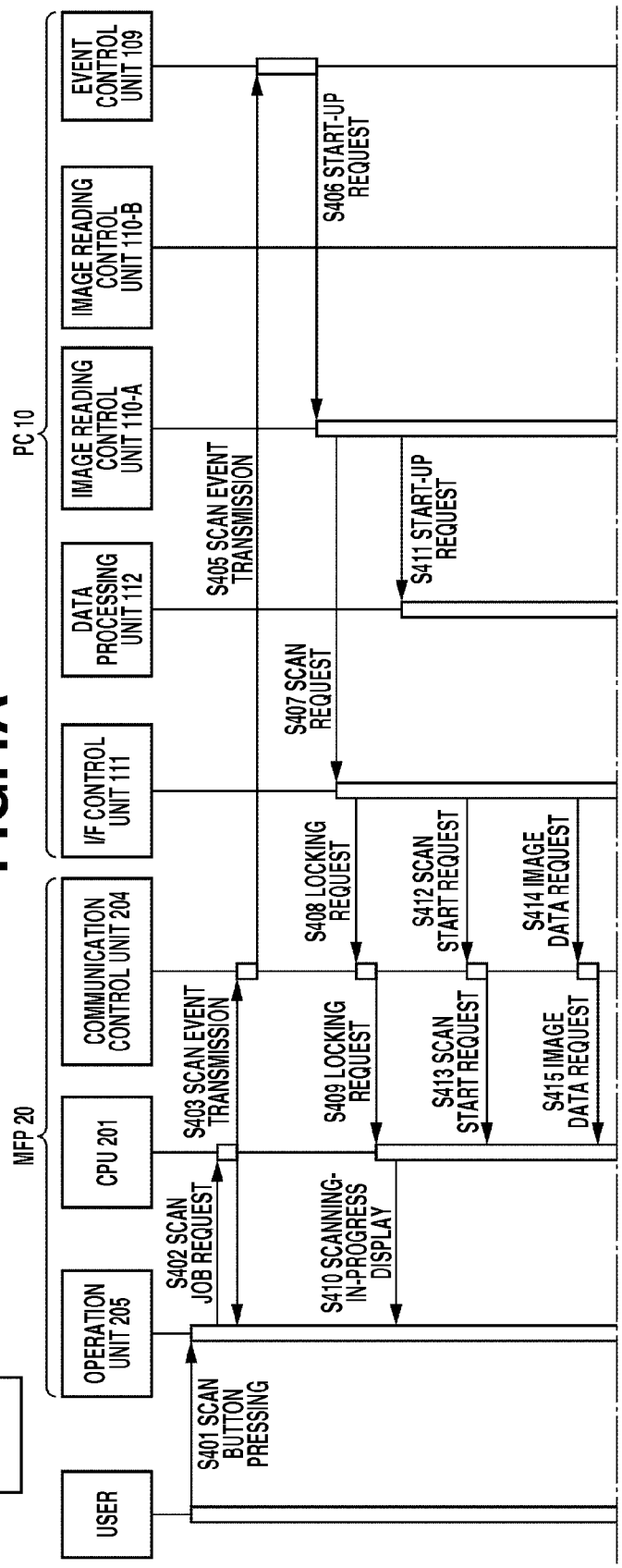
FIG. 4 illustrates a processing flow performed by a multi functional peripheral (MFP) and the PC.
Figure 4B:
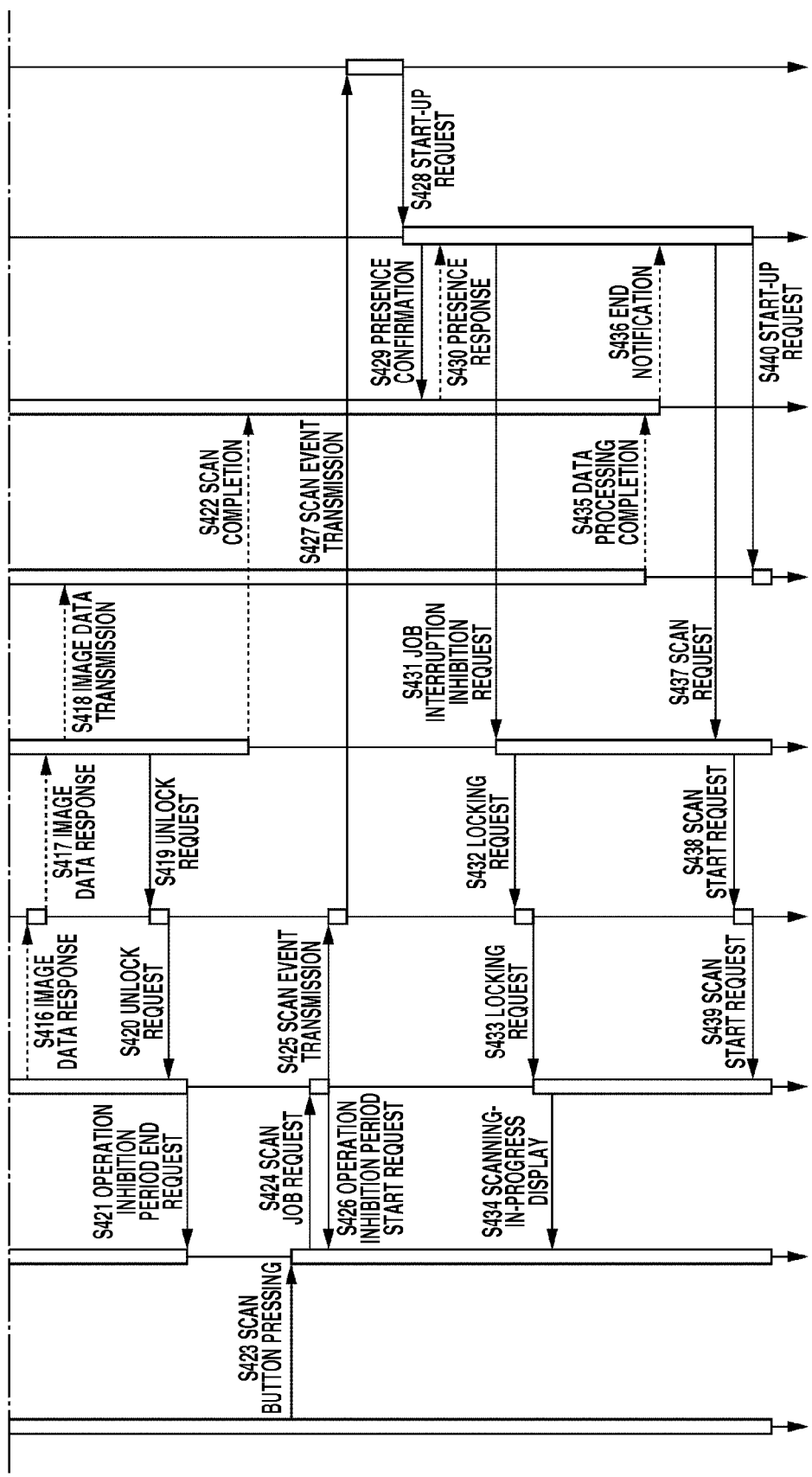

A case where the image reading processing is executed while the user is exchanging two pieces of documents is described as an example here. FIG. 4 illustrates a flow (i.e., sequence) of processing of the case.

In FIG. 4, a column named as "user" represents a task performed by a user. A column named as "MFP 20" represents processing in which the CPU 201 loads a program stored in the ROM 202 to the RAM 203 to run the program. A column named as "PC 10" represents processing in which the CPU 101 loads a program stored in the ROM 102 or the storage unit 106 to the RAM 103 to run the program. Further, in FIG. 4, the image reading control unit 110 determined to have started up in step S303 of FIG. 3 is referred to as an image reading control unit 110-A and the image reading control unit 110 that is started up thereafter is referred to as an image reading control unit 110-B. An operation of the image reading control unit 110-A and an operation of the image reading control unit 110-B may be carried out in the same process or may be carried out independently from each other.

When the user presses the scan button of the operation unit 205 in step S401, in step S402, the CPU 201 is notified that the scan job request has been issued. Upon receiving the notification, in steps S403 and S405, the CPU 201 transmits a command indicating generation of the scan event to the PC 10 via the communication control unit 204. The CPU 201 sets an operation inhibition period to the operation unit 205 and, in step S404, causes the operation unit 205 to shift to a state that an instruction of the other job is inhibited. At the time, the operation unit 205 displays a progress in preparation so as to allow the user to recognize that the operation unit 205 is placed in the operation inhibition period.

The processing in which the command in step S405 is received by the event control unit 109 corresponds to step S301 of FIG. 3. When the CPU 201 receives a request of the scan job in step S401, for example, the CPU 201 may not immediately accept the scan job since the CPU 201 is executing the other job according to off-line processing. In that case, the CPU 201 waits until the CPU 201 becomes capable of accepting the job. In a case where the locking request from the PC 10 is not received even after a predetermined time has passed after the operation unit 205 is shifted to the operation inhibition period, the scan event is cancelled and generation of an error is displayed on the operation unit 205. Then, the operation inhibition mode is unbanned and the MFP 20 returns to a standby mode (i.e., state that the job execution instruction is acceptable).

In step S406 corresponding to step S302, the event control unit 109 after receiving the notification of the generation of the scan event makes a start-up request to the image reading control unit 110 and the image reading control unit 110 (i.e., image reading control unit 110-A) is started up. The image reading control unit 110-A confirms whether the other image reading control unit 110 is started up at the time of start-up of the image reading control unit 110-A (i.e., corresponding to step S303). Since no other image reading control unit 110 is started up here, in step S407 corresponding to step S306, the image reading control unit 110-A instructs the I/F control unit 111 to transmit the scanning request immediately.

When the I/F control unit 111 receives the transmission instruction of the scanning request, in steps S408 and S409, the I/F control unit 111 makes the locking request to the MFP 20. When the CPU 201 receives the locking request, the CPU 201 inhibits the MFP 20 from accepting the other job. In step S410, the CPU 201 causes the operation unit 205 to display the notification of scanning in progress, thereby notifying the user that the other job cannot be accepted since the MFP 20 is carrying out scanning processing.

When the image reading control unit 110-A receives the start-up request in step S406 and starts up, in step S411, the image reading control unit 110-A also makes a start-up request of the data processing unit 112 for the purpose of causing the data processing unit 112 to process the read-out image data. As a result, also the data processing unit 112 is started up.

In steps S412 and S413, upon receiving the scanning request in step S407, if the I/F control unit 111 succeeds in locking the MFP 20 in response to the locking request, the I/F control unit 111 also makes a request to start scanning to the MFP 20. Upon completion of a preparation for reading the document, the CPU 201 after receiving the scan start request causes the image reading unit 206 to start reading an image.

When the image reading unit 206 starts reading the image, in steps S414 and S415, the PC 10 requests for thus read-out image data to the MFP 20. The CPU 201 causes the image reading unit 206 to read the image and stores pieces of read-out image data acquired as a result of image reading by the image reading unit 206 sequentially in the RAM 203. If the read-out image data to be transmitted to the PC 10 is stored in the RAM 203, in steps S416 and S417, the CPU 201 causes the read-out image data to be transmitted to the PC 10 via the communication control unit 204 as a response to the request for the image data.

When the I/F control unit 111 receives the read-out image data, in step S418 corresponding to step S307, the I/F control unit 111 transmits the read-out image data to the data processing unit 112 in order to perform predetermined data processing on the read-out image data. Processing of steps S414 through S419 is repeated until image reading for a single page is completed. If a determination is made that the image reading for the single page is completed, in steps S419 and S420, the I/F control unit 111 makes an unlock request to the MFP 20. The end of the image reading for the single page can be determined when the MFP 20 notifies information indicating the end of the image reading, and the PC 10 receives the notification or image data corresponding to the single page.

Instead of transferring the read-out image data in multiple pieces, the read-out image data may be transferred in the single page as a whole. When the CPU 201 receives the unlock request, in step S421, the CPU 201 provides an instruction to end the operation inhibition period to the operation unit 205. Then, the CPU 201 places the operation unit 205 into a state that the operation unit 205 can accept another instruction for a new job. At the time, since the display indicating the scanning in progress is cancelled in the operation unit 205, the user can recognize that the instruction for a new job can be provided.

In step S422, the I/F control unit 111 notifies the image reading control unit 110-A that the scanning by the image reading unit 206 of the MFP 20 is completed and ends itself.

After the user confirms that the display indicating that scanning is in progress is cancelled in the operation unit 205 and thus a new job can be instructed by the operation unit 205, so that the user exchanges the document set in the image reading unit 206 to a second document. In step S423, the user presses a scan button of the operation unit 205 in order to cause the image reading unit 206 to read out an image of the document. In steps S424 through S428, similar to steps S402 through S406, processing up to the start-up of the image reading control unit 110 is performed.

Since the image reading control unit 110-A has already been started up here, the image reading control unit 110 (i.e., image reading control unit 110-B) is started up in addition to the image reading control unit 110-A. Even if the image reading control unit 110 is started up redundantly, the image reading control unit 110-B that is started up later is just placed in a standby mode until the former image reading processing is completed. Therefore, only a small load is required in the above described processing.

When the image reading control unit 110-B is started up, in step S429 corresponding to step S303, the CPU 101 confirms whether the other image reading control unit 110 is started up. Since the other image reading control unit 110 has already been started up here, in step S430, a reply to that effect returns from the image reading control unit 110-A. Since the former image reading processing (i.e., image reading processing on the first document) has not been completed yet, the image reading control unit 110-B does not issue a command of the scanning request yet. However, in step S431 corresponding to step S304, the image reading control unit 110-B makes, at the time, a job interruption inhibition request to the PC 10 not to allow the MFP 20 to accept the job execution instruction according to the off-line processing.

In steps S422 and S423, the I/F control unit 111 makes the locking request to the MFP 20 in response to the job interruption inhibition request from the image reading control unit 110-B. When the CPU 201 receives the locking request, the CPU 201 inhibits the MFP 20 from accepting the other job. The CPU 201 causes the operation unit 205 to display to the effect that the image reading processing is not started yet by the MFP 20 with respect to the second document but the MFP 20 is currently performing scanning. In step S434, the CPU 201 notifies the user that the other job is not acceptable by the MFP 20 because the MFP 20 is carrying out scanning.

When the data processing of the read-out image data (i.e., the image data of the first document) in the former image reading processing is completed, in step S435, the data processing unit 112 notifies the image reading control unit 110-A that the data processing is completed. In step S436, the image reading control unit 110-A having received the notification that the data processing is completed notifies the end of the former image reading processing to the image reading control unit 110-B. Since the scanning is completed in response to the scanning request that the image reading control unit 110-A instructed in step S422 and the data processing corresponding to the scanning is completed in step S435, in step S309, the image reading control unit 110-A ends the operation of itself here.

In order to allow the image reading control unit 110-B to learn the end of the processing of the image reading control unit 110-A, instead of receiving an end notification from the image reading control unit 110-A, the image reading control unit 110-B may monitor the processing of the image reading control unit 110-A.

In step S437 corresponding to step S306, the image reading control unit 110-B after learning the end of the operation of the image reading control unit 110-A, makes a scanning request to the MFP 20. In steps S438 and S439, the I/F control unit 111 having received the scanning request transmits a scan start request to the MFP 20. In step S440, the image reading control unit 110-B makes a start-up request to the data processing unit 112 to cause the data processing unit 112 to perform data processing on the read-out image data read out by the current scanning.

Hereinafter, reading of the image on the document is performed by the image reading unit 206 at a side of the MFP 20. Processing of the read-out image data performed at a side of the PC 10 is similar to the processing performed in steps S414 through S422, and S425 so that descriptions thereof are omitted here.

As described above, when the PC 10 detects generation of the scan event in the MFP 20 and causes the MFP 20 to perform the image reading processing, if the image reading processing based on the scan event from the MFP 20 has already been started, the following image reading processing is placed in a standby mode. The PC 10 makes the locking request in order to inhibit interruption of a job in the MFP 20 during its standby mode. With the above configuration, even if a time period between the generation of the scan event in the MFP 20 and making of the scanning request by the PC 10 becomes longer, a possible timeout of the image reading processing based on the scan event can be reduced.

However, even in a case where the PC 10 detects the generation of the scan event in the MFP 20 when the image reading control unit 110 has already been started up, there may be a case that the locking request should not be made as following examples show.

A first example is a case where the image reading control unit 110 having been started up is not started by the event control unit 109 but is started according to the operation via the input unit 104 of the PC 10. In this case, the user designates contents of the processing while viewing the UI and pre-scanned images displayed on the display unit 105 and further provides the reading instruction. If the PC 10 detects the generation of the scan event in the MFP 20 before providing the reading instruction and, as described above, has provided the locking request, the MFP 20 would not be able to execute the image reading processing any more even when the reading instruction is provided via the UI of the PC 10.

A second example is a case where a plurality of image reading apparatus (i.e., MFPs) are connected to the PC 10 and the image reading processing can be executed by using a scanner driver common to the plurality of image reading apparatus, and further, where the PC 10 detects the generation of the scan event in each image reading apparatus. At the time, if the locking request is made based on the generation of the following scan event, the locked state continues although the image reading apparatus that generates the following scan event cannot perform any processing.

Figure 5:
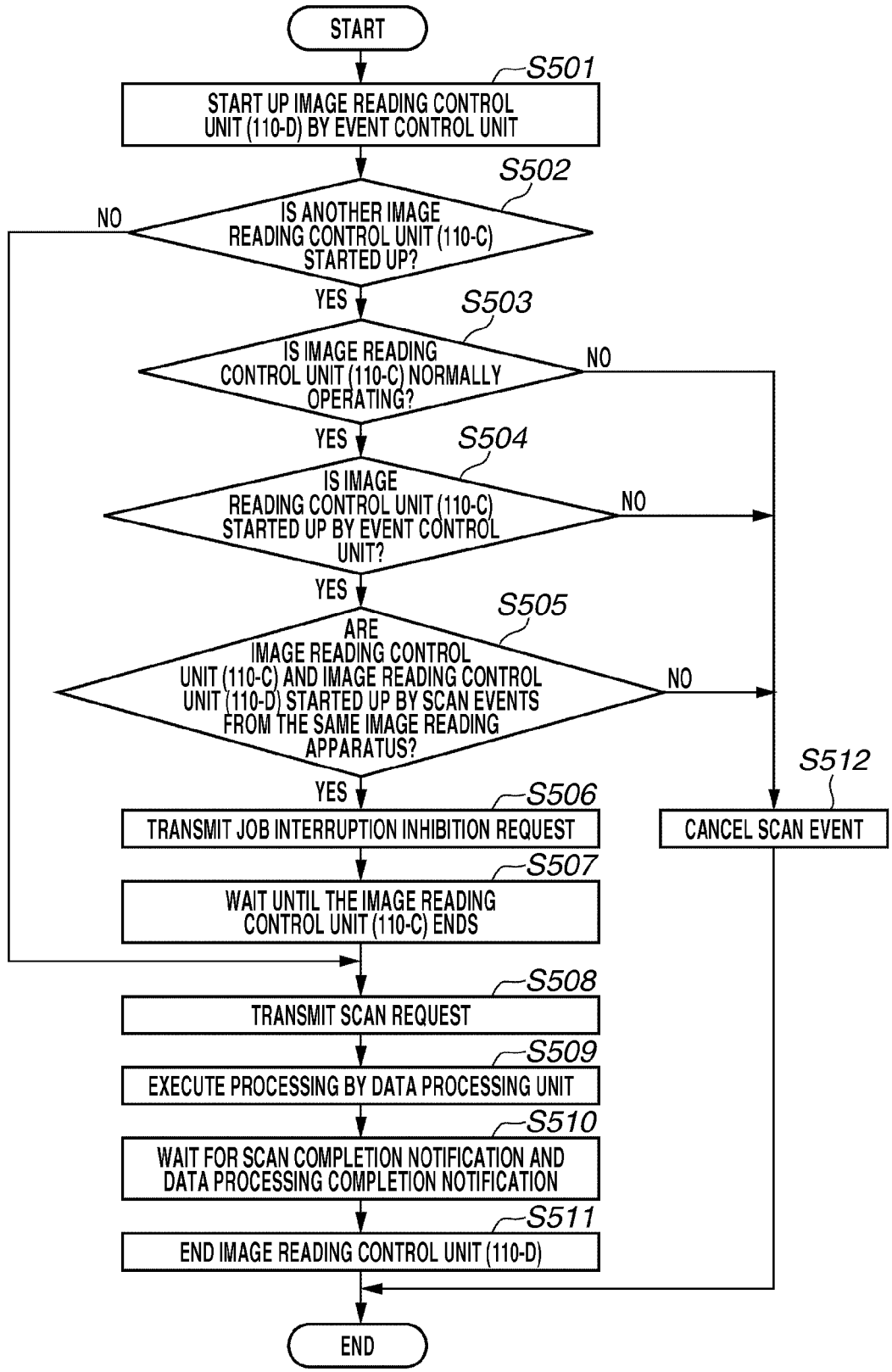
FIG. 5 is another flow chart illustrating the processing flow performed by the PC.

Therefore, in the determination in step S303 of FIG. 3, it is preferable to take the above into consideration. FIG. 5 is a flow chart illustrating a flow of processing performed in the PC 10 in this case. The flow chart illustrates processing performed such that a program stored in the ROM 102 or the storage unit 106 is loaded to the RAM 103 and the CPU 101 runs the program. Here, the image reading control unit 110 which is first started up is referred to as an image reading control unit 110-C and the image reading control unit 110 started up later is referred to as an image reading control unit 110-D.

In step S501, the image reading control unit 110 is started up according to the start-up request from the event control unit 109. Procedures in starting up the image reading control unit 110 are illustrated in steps S301 and S302 of FIG. 3 and steps S401 through S406 and S423 through S428 of FIG. 4. Therefore, the description thereof is omitted here.

In step S502, the CPU 101 determines whether the other image reading control unit 110 is started up. The determination is made similar to that made in step S303. In a case where the CPU 101 determines that the other image reading control unit 110 is started up (YES in step S502), the processing proceeds to step S503. In a case where the CPU 101 determines that the other image reading control unit 110 is not started up (NO in step S502), the processing proceeds to step S508. In step S508, processing is performed which is similar to the processing performed in a case where a negative determination is made in step S303 of FIG. 3 corresponding to steps S407 through S422 of FIG. 4.

In step S503, the CPU 101 determines whether the image reading control unit 110-C is normally operating. In a case where the CPU 101 determines that the image reading control unit 110-C is not normally operating (NO in step S503), since also the image reading control unit 110-D may not be normally operating, the processing proceeds to step S512. In step S512, the scan event that causes the image reading control unit 110-D to start up is cancelled and the cancellation result is notified to the MFP 20. The MFP 20 after receiving the notification causes the operation unit 205 to display an error message encouraging the user to provide, for example, the reading instruction again. In a case where the CPU 101 determines that the image reading control unit 110-C is normally operating (YES in step S503), the processing proceeds to step S504.

In step S504, the CPU 101 determines whether the image reading control unit 110-C is started up by the event control unit 109. In a case where a negative determination is made (NO in step S504), the image reading control unit 110-C currently in operation has been started up by an operation from the input unit 104 of the PC 10, so that the image reading processing performed by the image reading control unit 110-C is prioritized. Then, the processing proceeds to step S512 where the scan event that starts up the image reading control unit 110-D is cancelled and the cancellation result is notified to the MFP 20. In a case where a positive determination is made in step S504 (YES in step S504), the processing proceeds to step S505.

In step S505, the CPU 101 determines whether the scan event that serves as a trigger for the start-up of the image reading control unit 110-C and the scan event that serves as a trigger for the start-up of the image reading control unit 110-D are from the same image reading apparatus (i.e., MFP). In a case where a positive determination is made (YES in step S505), since it is the state similar to that illustrated in FIGS. 3 and 4, processing of steps S506 through S511 is performed in a similar manner to that illustrated in FIGS. 3 and 4. On the other hand, in a case where a negative determination is made (NO in step S505), in order to prioritize the processing of the scan event first generated, the processing proceeds to step S512. In step S512, the scan event that starts up the image reading control unit 110-D is cancelled and the cancellation result is notified to the image reading apparatus that has generated the scan event.

In a case where the image reading control unit 110 and the data processing unit 112 can execute a plurality of image reading processing in parallel, even in a case where a negative determination is made in step S505 (NO in step S505), the processing may proceed to step S508 without cancelling the scan event to cause them to execute the image reading processing.

In a case where a negative determination is made in steps S503, S504, and S505 (NO in steps S503, S504, and S505) and the processing proceeds to step S512, different notifications, instead of the same uniform notification, may be notified to the MFP 20. In a case where a negative determination is made in step S503 (NO in step S503), the CPU 101 sends a notification indicating, for example, that there may be abnormality at aside of the scanner driver 11 and causes the operation unit 205 to display a message encouraging restart of the PC 10.

In a case where a negative determination is made in step S504 (NO in step S504), it is notified that the scanner driver 11 is in use, for example, by an operation performed at a side of the PC 10. On the operation unit 205, a message is displayed urging the user to set the document again after the operation at the side of the PC 10 is completed, and to press the scan button.

In a case where a negative determination is made in step S505 (NO in step S505), the CPU 101 notifies, for example, that the other image reading apparatus is currently in the image reading processing and causes the operation unit 205 to display a message encouraging the user to perform an operation to press the scan button again after the processing by the other image reading apparatus is completed.

Further, with a method different from the above described processing, the MFP 20 may be prevented from shifting to the locked mode. For example, after the CPU 101 detects the scan event from the MFP to start up the image reading control unit 110, until processing of thus started image reading control unit 110 is completed, the event control unit 109 returns an error reply to the MFP with respect to the scan event other than the scan event from the same MFP. In a case where the image reading control unit 110 is started up via the operation from the input unit 104, the event control unit 109 returns the error reply to the notification of the scan event from the MFP until the processing of thus started image reading control unit 110 is completed.

As described above, according to the present exemplary embodiment, in a case where the former image reading processing is being performed when the CPU 101 detects that an image reading instruction is provided in the MFP (i.e., image reading apparatus), the following image reading processing is caused to wait and the image reading apparatus is prohibited from accepting a new job. Therefore, the image reading processing based on the reading instruction provided while the former image processing is performed can be adequately executed.

More specifically, even if it takes time after the user instructs reading-out of an image in the MFP and before the reading-out of the image is actually started, a possible cancellation of reading-out of the image due to a timeout can be reduced. Consequently, the data processing unit can be configured not to perform a plurality of processing in parallel, so that a load becomes lower at a side of the PC. At the time, the reading-out of the image by the MFP is also placed in the standby mode, so that a large capacity of the storage unit is not required any more in the MFP and the PC. It is not necessary for the following image reading processing to wait until the former image reading processing ends completely. The following image reading processing can be started if the former image reading processing advances to a stage that the following image reading processing can start the processing.

Furthermore, the MFP is placed in the locked mode until the reading-out of the image by the MFP is started, so that no interruption of the other job occurs any more. In the above description, the MFP does not accept the job instruction from the operation unit 205 when the MFP is placed in the locked mode. However, the job that the MFP does not accept may be limited to a job using the image reading unit. In this case, acceptance of a job using the image reading unit as well as an instruction from the PC may also be inhibited.

Accordingly, in a case where the MFP and the PC are connected to each other via a network, by placing the MFP in the locked mode, the reading instruction from the other PC can be blocked and an image of a document already set can be prevented from being viewed by a user of the other PC. The image reading apparatus may be not only the MFP but instead the image reading apparatus may be an apparatus which has only an image reading function. Also, an unexpected image (i.e., an image of a document set for the off-line processing) can be prevented from being transmitted to the PC.

Further, in a case where the scanner driver is started up via the operation at the side of the PC, even when the reading instruction is issued from the MFP, the MFP is not locked. Accordingly, the image reading processing via the operation at the side of the PC can be performed in a suitable manner. In addition, in a case where the scan events from the plurality of MFPs conflict with each other, the first generated scan event can be adequately processed and the scan event generated later is prevented from being unintentionally placed in the locked mode.

In the above description, a typical PC is described as an example of the image reading control apparatus; however, the image reading control apparatus is not limited thereto but a device of the image reading apparatus dedicated to control may be employed. The off-line processing according to the MFP may be processing other than copying processing in which the read-out image data from the image reading unit is supplied to the print unit to print the read-out image data. For example, the off-line processing according to the MFP may be processing in which the read-out image data, acquired by the MFP actively reading out the image on the document with the image reading unit 206 according to the instruction from the operation unit, may be stored in the storage unit connected to the MFP or transmitted to an external device.

The present exemplary embodiment can be realized also by executing the following processing. Software (i.e., program) that realizes the function of the above described exemplary embodiment is supplied to a system or a device via a network or various types of storage media and a computer (e.g., CPU and MPU) of the system or the device reads out the program to execute it. The program may be executed by a single computer or may be executed by a plurality of computers which are coupled to each other. It is not essential to realize all of the above described processing with software but the processing may be partially or entirely realized by hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-146195 filed Jun. 30, 2011, which is hereby incorporated by reference herein in its entirety.

What is claimed is:

1. An image reading control apparatus that is connected to one or more reading devices for reading an image, the apparatus comprising:
a memory configured to store at least one program, and
a processor configured to execute the at least one program stored in the memory,
wherein the processor detects a first instruction provided by a user to a reading device, and requests the reading device to perform a first reading of an original and to inhibit executing another reading,
wherein the processor receives image data obtained by the first reading by the reading device, from the reading device,
wherein the processor performs processing for the received image data obtained by the first reading,
wherein the processor request the reading device to unlock the inhibiting of another reading, in response to completion of reception of the image data, even before the processing is completed,
wherein, in a case where the processor further detects a second instruction for a second reading, the processor determines whether or not the second instruction is provided to the same reading device to which the first instruction has been provided,
wherein in a case where the processor detects the second instruction in a state where the processor is performing the processing for the received image data obtained by the first reading after the unlocking of the inhibiting of another reading is requested, and determines that the second instruction is provided to the same reading device, the processor does not request the same reading device to perform the second reading until the processing is completed, requests the same reading device to inhibit executing another reading even before the second reading is requested, and requests the same reading device to perform the second reading after the processing is completed,
wherein, in a case where the processor determines that the second instruction detected in the state is not provided to the same reading device, the processor cancels the second instruction, and
wherein, in a case where the processor detects the second instruction after the processing for the received image data obtained by the first reading is completed, the processor does not request a reading device to which the second instruction has been provided, to inhibit executing another reading, and requests the reading device to perform the second reading, regardless of whether the second instruction is provided to the same reading device or not.

2. The image reading control apparatus according to claim 1, wherein the processor detects the first instruction by monitoring generation of a reading event in the reading device.

3. The image reading control apparatus according to claim 1, wherein in a case where the processor detects the second instruction in a state where the processor is performing the processing for the received image data obtained by the first reading after the unlocking of the inhibiting of another reading is requested, and determines that the second instruction is provided to the same reading device, the processor requests the same reading device to perform the second reading after the processing is completed, even if the second reading is not instructed again by a user.

4. The image reading control apparatus according to claim 1, wherein, in a case where the processor detects the second instruction provided to the same reading device in a state where the processing based on the first reading is completed, the processor requests the same reading device to perform the second reading and to inhibit executing of reading different from the second reading, to the same reading device.

5. An image reading method using an image reading control apparatus that is connected to one or more reading devices for reading an image, the method comprising:

detecting a first instruction provided by a user to a reading device;

requesting the reading device to perform a first reading of an original and to inhibit from executing another reading;

receiving image data obtained by the first reading by the reading device, from the reading device;

performing processing for the received image data obtained by the first reading by the reading device;

requesting the reading device to unlock the inhibiting of another reading, in response to completion of reception of the image data, even before the processing is completed;

detecting a second instruction for a second reading in a state where the processing for the received image data obtained by the first reading is being performed after the unlocking of the inhibiting of another reading is requested; and determining whether or not the second instruction is provided to the same reading device to which the first instruction has been provided;

wherein, in a case where it is determined that the second instruction detected in the state is provided to the same reading device, the requesting step does not request the same reading device to perform the second reading until the processing is completed, and requests the same reading device to inhibit executing another reading even before the second reading is requested, and requests the same reading device to perform the second reading after the processing is completed, wherein, in a case where it is determined that the second instruction detected in the state is not provided to the same reading device, the requesting step cancels the second instruction, and wherein, in a case where the second instruction is detected after the processing for the received image data obtained by the first reading is completed, the processor does not request a reading device to which the second instruction has been provided, to inhibit executing another reading, and requests the reading device to perform the second reading, regardless of whether the second instruction is provided to the same reading device or not.

6. The image reading method according to claim 5, wherein, in a case where the request to inhibit executing another reading or the request to performing reading is not transmitted from the image reading control apparatus even after a predetermined time period has passed after the first instruction or the second instruction is provided, the image reading device cancels the first instruction or the second instruction.

7. The image reading method according to claim 5, wherein the detecting step detects the first instruction by monitoring generation of a reading event in the reading device.

8. The image reading method according to claim 5, wherein in a case where it is determined that the second instruction detected in the state is provided to the same reading device, the requesting step requests the same reading device to perform the second reading after the processing is completed, even if the second reading is not instructed again by a user.

9. The image reading method according to claim 5, wherein in a case where the detecting step detects the second instruction provided to the same reading device in a state where the processing based on the first reading is completed, the requesting step requests the same reading device to perform the second reading and to inhibit executing of reading different from the second reading, to the same reading device.

10. A non-transitory storage medium in which a program, for causing an image reading control apparatus that is connected to one or more reading devices for reading an image, to execute a method, has been stored, the method comprising:

detecting a first instruction provided by a user to a reading device;

requesting the reading device to perform a first reading of an original and to inhibit from executing another reading;

receiving image data obtained by the first reading by the reading device, from the reading device;

performing processing for the received image data obtained by the first reading by the reading device;

requesting the reading device to unlock the inhibiting of another reading, in response to completion of reception of the image data, even before the processing is completed;

detecting a second instruction for a second reading in a state where the processing for the received image data obtained by the first reading is being performed after the unlocking of the inhibiting of another reading is requested; and determining whether or not the second instruction is provided to the same reading device to which the first instruction has been provided;

wherein, in a case where it is determined that the second instruction detected in the state is provided to the same reading device, the requesting step does not request the same reading device to perform the second reading until the processing is completed, and requests the same reading device to inhibit executing another reading even before the second reading is requested, and requests the same reading device to perform the second reading after the processing is completed, wherein, in a case where it is determined that the second instruction detected in the state is not provided to the same reading device, the requesting step cancels the second instruction, and wherein, in a case where the processor detects the second instruction after the processing for the received image data obtained by the first reading is completed, the processor does not request a reading device to which the second instruction has been provided, to inhibit executing another reading, and requests the reading device to perform the second reading, regardless of whether the second instruction is provided to the same reading device or not.

11. The storage medium according to claim 10, wherein, in a case where the request to inhibit executing another reading or the request to performing reading is not transmitted from the image reading control apparatus even after a predetermined time period has passed after the first instruction or the second instruction is provided, the image reading device cancels the first instruction or the second instruction.

12. The storage medium according to claim 10, wherein the detecting step detects the first instruction by monitoring generation of a reading event in the reading device.

13. The storage medium according to claim 10, wherein in a case where it is determined that the second instruction detected in the state is provided to the same reading device, the requesting step requests the same reading device to perform the second reading after the processing is completed, even if the second reading is not instructed again by a user.

14. The storage medium according to claim 10, wherein in a case where the detecting step detects the second instruction provided to the same reading device in a state where the processing based on the first reading is completed, the requesting step requests the same reading device to perform the second reading and to inhibit executing of reading different from the second reading, to the same reading device.

\* \* \* \* \*